US005417065A

United States Patent [19]

Liou

[11] Patent Number: 5,417,065

[45] Date of Patent: May 23, 1995

[54] OIL PRESSURE DEVICE OF JACK

[76] Inventor: Guey-juh Liou, No. 42, Buh-tzyy Keng, Taiping Hsiang, Taichung Shiann, Taiwan, Prov. of China

[21] Appl. No.: 207,497

[22] Filed: Mar. 7, 1994

[51] Int. Cl.[6] .......................... F16D 31/02; F04B 19/02

[52] U.S. Cl. .......................... 60/479; 60/481; 417/469

[58] Field of Search .......................... 92/51; 60/477, 479, 60/480, 481, 482; 417/460, 468, 469

[56] References Cited

U.S. PATENT DOCUMENTS

| | | | |
|---|---|---|---|
| 2,250,551 | 7/1941 | Pfauser | 60/479 |
| 2,618,122 | 11/1952 | Gratzmuller | 60/482 |
| 2,624,174 | 1/1953 | Loef | 60/481 |
| 3,806,091 | 4/1974 | Wride | 60/482 X |
| 4,840,548 | 6/1989 | Hammelmann | 417/469 |

FOREIGN PATENT DOCUMENTS

| | | | |
|---|---|---|---|
| 1158643 | 1/1958 | France | 60/481 |
| 948122 | 8/1956 | Germany | 60/480 |

*Primary Examiner*—Edward K. Look
*Assistant Examiner*—Hoang Nguyen

[57] ABSTRACT

An oil pressure device for a jack whereby a hydraulic jack is adapted to raise rapidly until the lifting portion of the jack reaches a load sufficient to overcome a spring operating force, at which point the operation of the jack shifts to a slower, more powerful mode to raise the load.

1 Claim, 4 Drawing Sheets

OIL PRESSURE DEVICE OF JACK

BACKGROUND OF THE INVENTION

The present invention relates generally to a lifting device, and more particularly to an oil pressure device of a jack.

As shown in FIG. 1, a prior art jack comprises an oil pressure cylinder 1 which is provided with a first receiving space 2, a second receiving space 3, and a third receiving space 4 disposed on the cap cover located at one end of the oil pressure cylinder 1. The third receiving space 4 is provided therein with a push rod 5. As the push rod 5 is pulled backwards, the oil kept in the second receiving space 3 is forced to flow into the third receiving space 4 via a one-way valve 6. The oil in the third receiving space 4 is forced to flow into the first receiving space 2 at the time when the push rod 5 is caused by an external force to move forward, thereby causing a driving rod 7 to move forward so as to provide the jack with a power for lifting or hoisting a heavy object. The second receiving space 3 is provided therein with an oil unloading rod 8, which can be caused to turn to withdraw from an oil returning oil 9. As the pressure in the first receiving space 2 begins to diminish, the driving rod 7 is caused to withdraw by the reaction force of the heavy object lifted by the jack, thereby causing the oil to flow back to the second receiving space 3 from the first receiving space 2 via the oil returning hole 9.

The prior art oil pressure device described above is defective in design in that the driving rod 1 is caused to move forward slowly and that the jack can not be therefore raised rapidly to reach a heavy object intended to be lifted.

SUMMARY OF THE INVENTION

It is therefore the primary objective of the present invention to provide a jack with an improved oil pressure device capable of raising initially the jack at a rapid pace to reach a heavy object intended to be lifted.

The foregoing objective of the present invention is attained by the improved oil pressure device, which comprises a stepped push rod having one end that is provided with a through hole and further having another end that is provided with a receiving space greater in dimension than the through hole. Located inside the through hole are a plurality of leakproof rings. The receiving space is provided therein with a spring. The through hole is further provided therein with a small push rod having a stopping disk. The push rod can be caused to advance rapidly so as to raise the jack at a fast pace to reach a heavy object intended to be lifted.

The foregoing objective, structures, features and functions of the present invention can be more rapidly understood by studying the following detailed description of the present invention in conjunction with the drawings provided herewith.

DETAILED DESCRIPTION OF THE INVENTION

Figure 1:
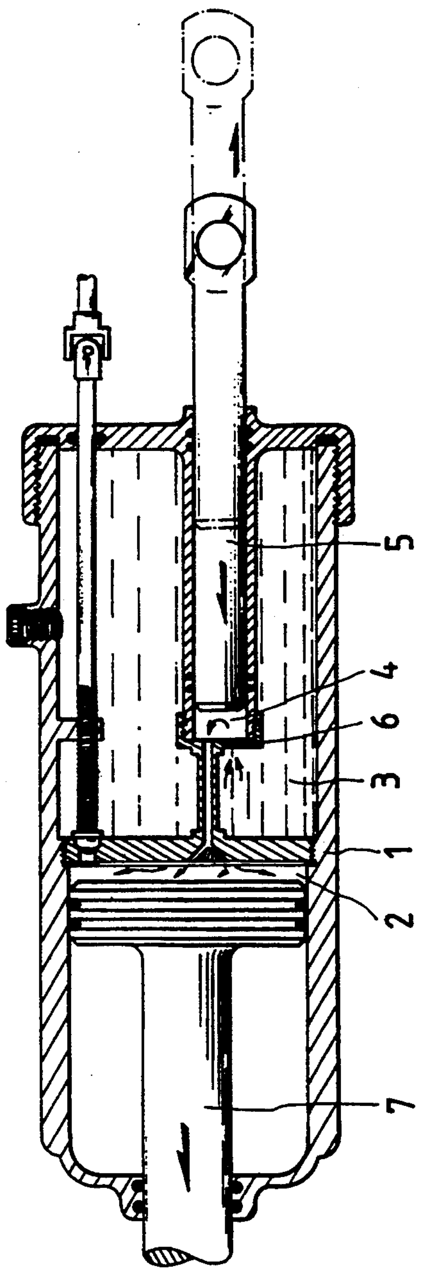
PRIOR ART FIG. 1
FIG. 1 shows a schematic view of an oil pressure device in action of a prior art jack.
Figure 2:
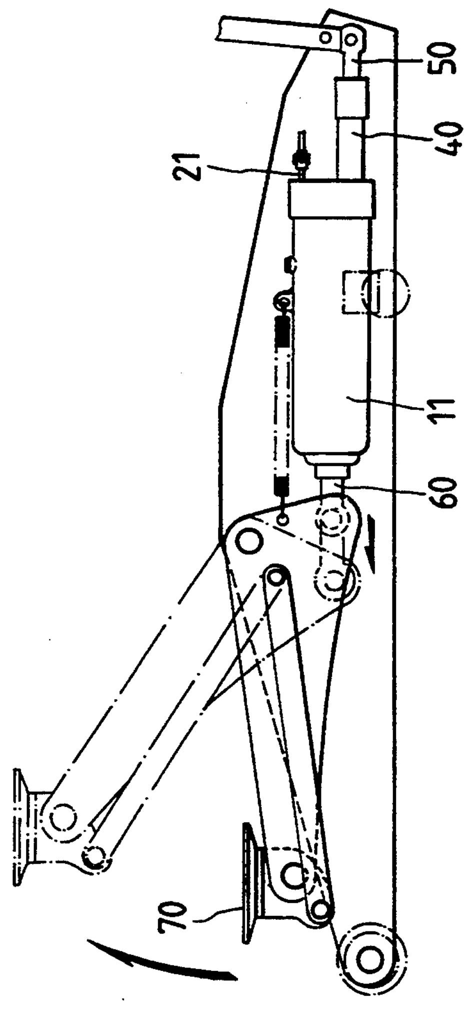
FIG. 2 shows a prespective schematic view of a jack in action, according to the present invention.
Figure 3:
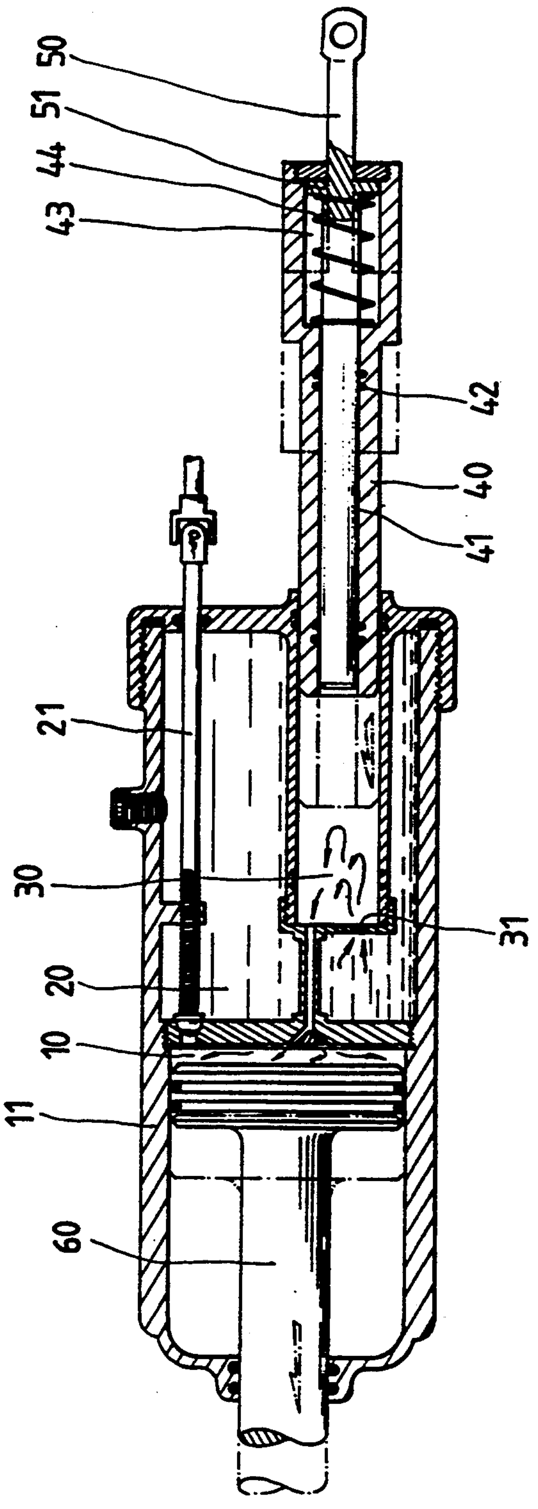
FIG. 3 shows a schematic view of an oil pressure device of the jack at work, according to the present invention.

Referring to FIGS. 2 and 3, an oil pressure device 11 embodied in the present invention is shown to comprise a pushing chamber 10, an oil storing chamber 20, and a pressing chamber 30 which is provided therein with a push rod 40 of a stepped construction. The push rod 40 has one end that is provided with a through hole 41 and further has another that is provided with a receiving space 43 greater in dimension than the through hole 41. Disposed in the through hole 41 are a plurality of leakproof rings 42. The receiving space 43 is provided therein with a spring 44. The through hole 41 is further provided therein with a small push rod 50 having a stopping disk 51 formed integrally therewith.

Figure 4:
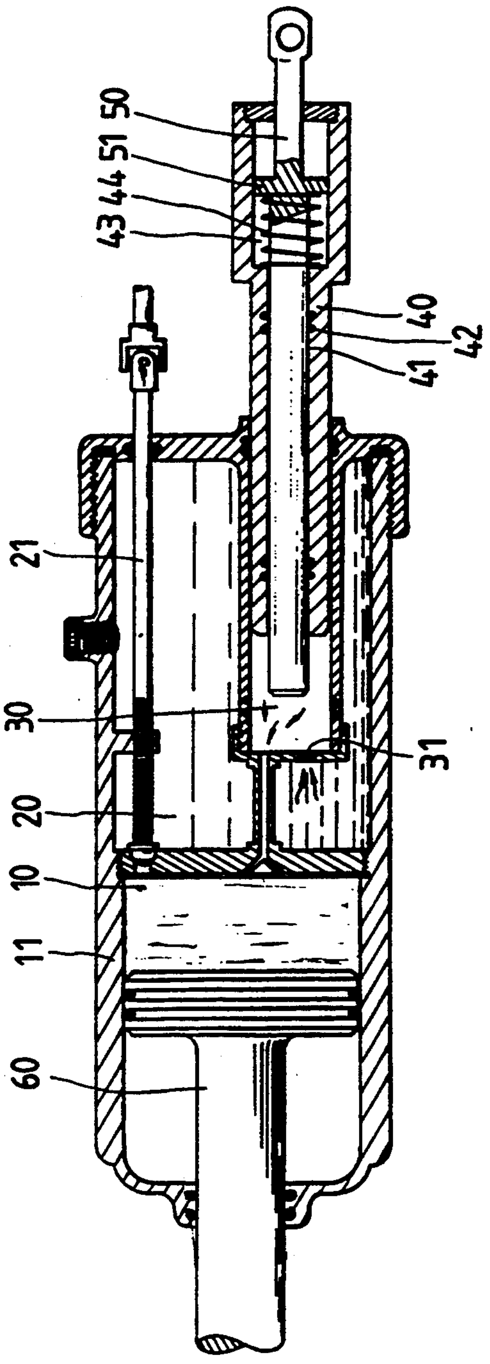
FIG. 4 shows another schematic view of the oil pressure device of the jack at work, according to the present invention.

As illustrated in FIG. 4, the small push rod 50 is caused by an external force to actuate the push rod 40 to move. As a result, a predetermined quantity of oil stored in the oil storing chamber 20 is caused to flow into the pressing chamber 30 via a one-way valve 31.

As the small push rod 50 is once again acted on by the external force to move forward, the push rod 40 is acted on by an elastic force of the spring 44 so as to cause the oil in the pressing chamber 30 to flow rapidly into the pushing chamber 10, thereby causing a driving rod 60 to move forward at a rapid pace. The rapid forward movement of the driving rod 60 actuates a lifting patform 70 of the jack to rise accordingly at a fast pace to reach a heavy object intended to be lifted. As soon as the lifting patform 70 is caused to make contact with the heavy object, the push rod 40 is caused to stop moving. In the meantime, the small push rod 50 is kept being exerted on by the external force so as to force the oil to flow continuously into the pushing chamber 10, thereby causing the driving rod 60 to work continuously until such time when the heavy object is lifted by the lifting platform 70 of the jack to arrive at a desired location.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claim.

What is claimed is:

1. An oil pressure device for a jack comprising:

a first push rod having an outer end that is greater in diameter that a main body of said push rod, said outer end including a receiving space with a spring therein, the first push rod being hollow so as to receive a second push rod in an interior portion of said first push rod, said second push rod including a stopping disk integral thereto, said stopping disk being biased by said spring toward a position against said outer end of said first push rod, an inner end of said second push rod being flush with an inner end of said first push rod when the spring is extended; wherein an external force is applied to said second push rod, thereby moving both said second push rod and said first push rod forward, forcing fluid into a pressing chamber, which action is repeated until a load on the jack is sufficient to overcome the biasing force of said spring, at which time only said second push rod is moved in response to said external force, so that only the second push rod is forcing fluid into the pressing chamber.

* * * * *